United States Patent

[11] 3,610,960

[72] Inventor Steven R. Hofstein
Princeton, N.J.
[21] Appl. No. 730,840
[22] Filed May 21, 1968
[45] Patented Oct. 5, 1971
[73] Assignee RCA Corporation

[54] SCAN GENERATOR CIRCUIT
8 Claims, 5 Drawing Figs.

[52] U.S. Cl. ........................................................ 307/251,
307/242, 307/255, 340/347
[51] Int. Cl. ........................................................ H03k 17/60,
H03k 13/25, H03k 17/62
[50] Field of Search ........................................... 340/347
AD, 347 DA, 147; 307/235, 242, 251, 254, 304,
208, 220, 223, 224, 255; 328/106, 130, 97

[56] References Cited

UNITED STATES PATENTS

| | | | |
|---|---|---|---|
| 3,286,189 | 11/1966 | Mitchell et al. ............... | 307/251 X |
| 3,335,292 | 8/1967 | Alburger ....................... | 307/235 X |
| 3,417,261 | 12/1968 | Walsh .......................... | 307/217 X |
| 3,370,272 | 2/1968 | Kenedi ......................... | 340/147 |
| 3,436,753 | 4/1969 | Walker et al. ................ | 340/347 |

*Primary Examiner*—Maynard R. Wilbur
*Assistant Examiner*—Michael K. Wolensky
*Attorney*—H. Christoffersen

ABSTRACT: A circuit for converting an analog signal into sequentially spaced digital pulses. The circuit includes a chain of "N" identical stages which convert a signal amplitude to pulses and sequencing control means which determine the conduction sequence of the "N" stages. Each stage, comprising two active devices having their conduction paths direct current connected in series, is serially excited as a function of the signal amplitude and produces a corresponding sampling pulse on one of "N" output lines.

INVENTOR
STEVEN R. HOFSTEIN

BY H. Christoffersen
ATTORNEY

INVENTOR
STEVEN R. HOFSTEIN

BY H. Christoffersen
ATTORNEY

SCAN GENERATOR CIRCUIT

BACKGROUND OF THE INVENTION

Solid-state arrays (i.e., light emitters or image sensors), may be manufactured with densities in excess of 500 elements per inch. These elements may be accessed by leads brought out to the periphery of the array and connected to the output stages of a scan generator.

The scan generator is used to scan or sample the elements of the sensor in a known and repetitive sequence so that useful information, be it serial or parallel, is extracted from the sensor. Optimization of the sensor-scanner system requires that the scan generator chip abut the sensor chip in order to minimize lead length, capacitive loading and noise pickup. To meet this requirement the scan generator must have a functional density equal to that of the sensor. There must be as many scanning stages per inch as there are elements per inch in the sensor array.

The problems in manufacturing such a high density scan generator are multifold. The total number of components to be diffused on a chip affects the yield. The total number of components, in turn, is directly related to the number of components per function. If the latter can be kept low, then both scan generator and sensor could be built with similar densities. The high density sensor described must perforce have few components per function.

A second problem is that of power dissipation. Any internal power dissipation, causing the chip temperature to rise, must be handled by means of a heat sink which negates the benefits of integration and compactness by necessitating large surface areas to dissipate the heat.

Therefore, two basic criteria which the ideal scan generator must meet are:

1. minimum number of components per stage; and
2. minimum power dissipation.

Presently known circuits for sampling or scanning take a variety of forms such as the shift register, which may be static or dynamic, and the counter-decoder type.

Static shift registers have a wide frequency range but they require large numbers of components and consume much power.

Dynamic shift registers do not operate at low frequencies (<10 kHz.) due to capacitive type storage which also limits the upper frequency range. These registers need fewer parts and use less power than the static registers but they require a plurality of clock generators which have to be phased and which consume power.

The counter-decoder combination is a frequency divider scheme wherein a basic clock frequency is divided down in various counters and then decoded to provide unique time slots which are sequentially propagated along parallel output lines connected to its associated sensor. This scheme lies between the static and dynamic register in the numbers of components used and the total power consumed.

It is the object of the present invention to provide a new and improved scan generating scheme which minimizes the number of components per stage, reduces drastically the total power consumed, minimizes the number of interconnections and cross-connections and eliminates the use of an oscillator.

BRIEF SUMMARY OF THE INVENTION

Circuits embodying the invention include a chain of "N" similar stages which function to convert a signal amplitude into pulses. Each stage, comprising two active devices having their conduction paths direct current connected in series, is serially excited as the signal amplitude increases. When the two active devices are simultaneously energized, they produce a low impedance path resulting in a sampling pulse at the output of the stage. A single direct current connection between adjoining stages enables the succeeding stage to cut off the preceding stage so that only one stage of the chain draws power at any one time.

The simplicity of the circuit of the invention enables the production of a high density, lower power, high yield scan generator.

DETAILED DESCRIPTION

The novel circuit disclosed presents a simple means for converting a signal amplitude into digital pulses. The circuit may be used as an analog-to-digital converter but is especially suited for use as a scan generator.

The simplicity of the circuit lies in the use of an iterative network comprised of N similar stages, preferably identical, wherein each stage comprises two active devices having their conduction paths connected in series. The numeral N is used to indicate that there are no inherent limitations on the number of stages within the chain. The number of stages of the chain will be chosen to correspond to the number of sensor stages to be scanned.

The limitations on the active devices used to implement circuits according to the invention are minimal so that bipolar and unipolar transistors may be used and even vacuum tubes may be employed. Solid state devices are preferred since they lend themselves to large scale integration and are generally easier to direct current DC couple. The term direct current DC connected, as used in this application, refers to a connection permitting direct current to flow though the connecting means may be a nonnegligible impedance.

The output pulses produced by the circuit of the invention are called digital pulses because they will all be substantially similar in amplitude and width so long as the rate of change of the input signal amplitude with respect to time remains constant during a sweep of the N stages. The amplitude of the pulses will be two-valued corresponding to an "on" and "off" condition. The pulse width is an inverse function of the rate of change of the input signal.

Figure 1:
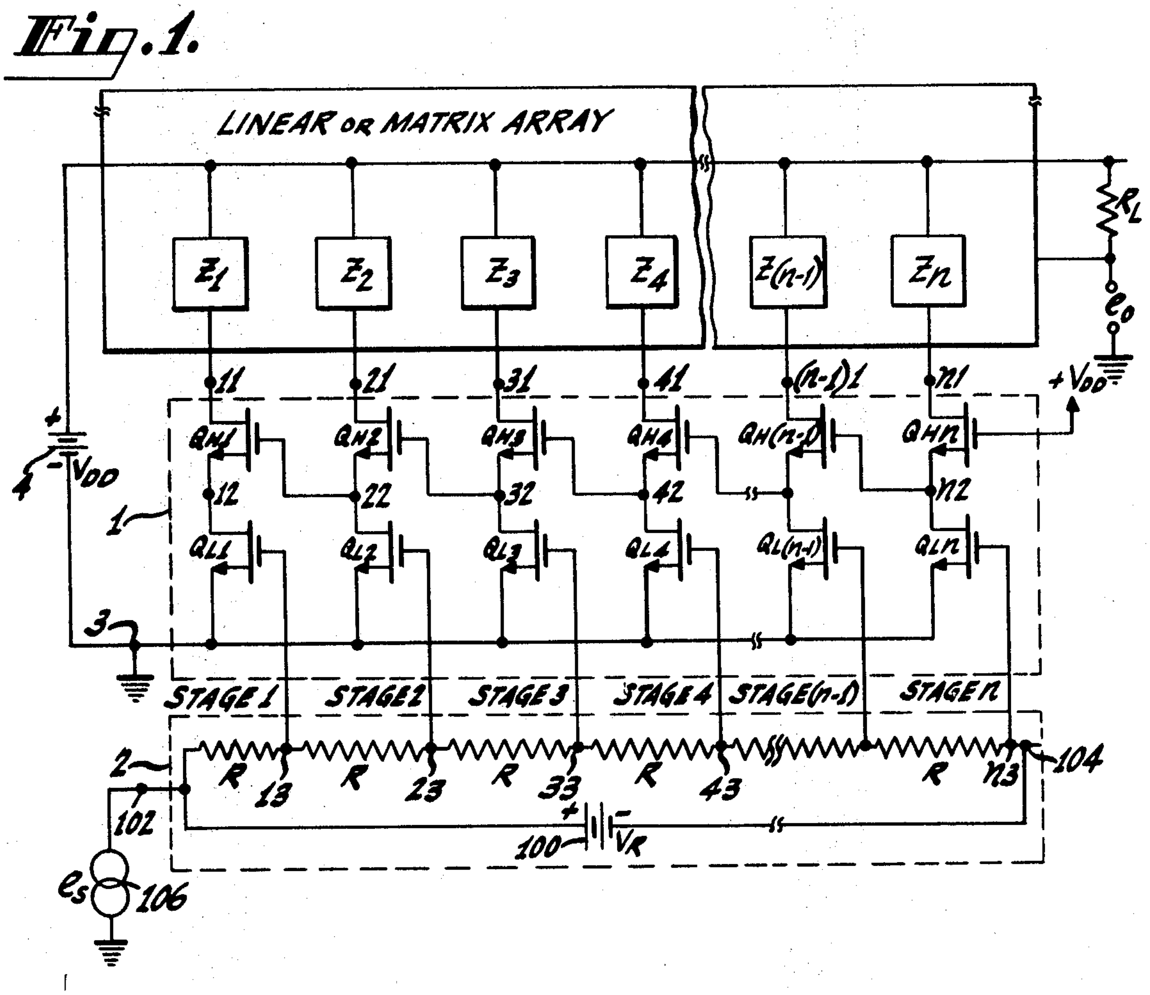
FIG. 1 is a schematic drawing of a scan generator circuit embodying the invention.

A scan generator embodying the invention is shown in FIG. 1. It consists of a chain of N identical stages which generate sampling pulses sequentially on N parallel output lines. Functionally, the scan generator may be subdivided into a converter 1 section and a biasing network 2 or sequence control means section. The converter 1, which includes N stages each comprising two active devices per stage formed from an upper row of transistors ($Q_H$) and a row of lower transistors ($Q_L$), converts voltage input levels into digital pulses. Biasing network 2 provides a transmission path for the input signal and sets the threshold level at which each stage goes into conduction, thereby controlling the conduction sequence.

The structure of each of the "N" stages is identical. The first and last stage differ from the rest in the manner of connection. Therefore, the second stage, being a typical cell of the chain, will be described in detail. Components of the converter 1 are designated by a letter Q followed by a numeral subscript consisting of an H and a digit or an L and a digit. The H and L indicate the upper or lower row, respectively, while the digit identifies the stage. Junction points of the converter 1 and sequence controller 2 are designated by a two digit number. The first digit refers to the position of the stage along the chain, while the second digit designates the junction. Like points are designated by the same second digit. The active devices shown in FIG. 1 are N-channel insulated-gate field-effect (IGFET) transistors of the enhancement type. Each device has a control electrode which is the gate electrode. The potential on the gate electrode controls the impedance of the conduction path defined by the drain and source electrodes. The source electrodes of N-channel, IGFETs are indicated by an arrow pointing away from the channel. In the N-type devices current flows between source and drain when the voltage at the gate electrode is increased relative to the voltage at the source.

The conduction paths of transistors $Q_{H2}$ and $Q_{L2}$ are connected in series between output point 21 and a point of reference potential 3, illustrated as circuit ground. The drain electrode of transistor $Q_{H2}$ is connected to output point 21 which is connected through load impedance $Z_2$ to a source 4 of $+V_{DD}$ operating potential. The load impedances are meant to include the sensor array element to be sampled and any external impedance, such as a resistor, necessary to shunt the array element resistor $R_L$ is provided to produce an output $e_o$, a signal indicative of the status of the sensor array element being sampled or switched by the concurrent closure of its associated $Q_L$ and $Q_H$ transistors. The source electrode of transistor $Q_{H2}$ and the drain electrode of transistor $Q_{L2}$ are connected in common to junction point 22, which is direct current connected to the gate of the transistor $Q_{H1}$ in the preceding stage. The direct current connection is shown as a wire. The current path is completed by returning the source electrode to the point of reference potential 3. The gate of transistor $Q_{H2}$ is direct current connected to the succeeding stage at common point 32, which is the junction point of the source electrode of transistor $Q_{H3}$ and the drain electrode of transistor $Q_{L3}$. The gate of transistor $Q_{L2}$ is directly connected to a tap point 23 on the biasing network.

Figures 2, 3, 4:
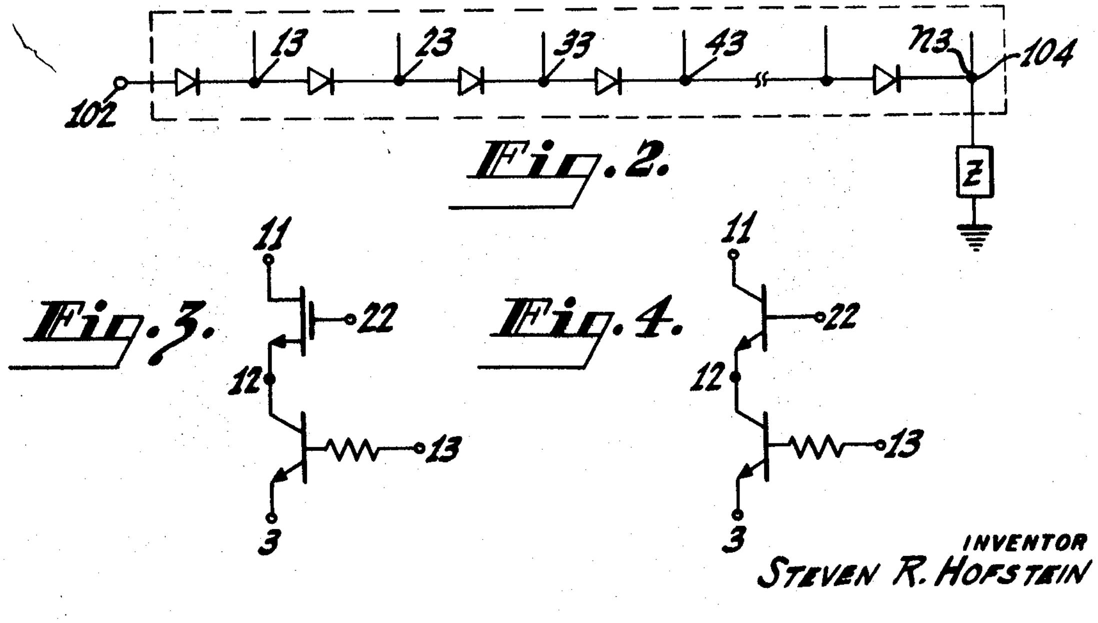
FIG. 2 is a schematic drawing of a threshold network that may be used in practicing the invention.
FIG. 3 is a schematic drawing of a hybrid stage configuration embodying the invention.
FIG. 4 is a schematic drawing of a bipolar stage configuration embodying the invention.

The biasing network 2 is a distributed resistive line with a source 100 of potential $V_R$ connected across the terminals of the resistive line, points 102 and 104, respectively. The source 100 of potential $V_R$ is poled to provide a quiescent reverse bias on the gates of the lower row of transistors ($Q_L$) of the converter 1 section. It should be noted that instead of distributed parameters, the resistive line may be composed of lumped parameters. An alternate biasing network requiring no source of DC potential may be used to practice the invention, as shown in FIG. 2, wherein forward biased PN junctions are used to generate N substantially equal potential increments in response to an applied input signal. The forward biased junctions serve to drop the input voltage progressively. A similar function may be achieved by means of a ladder network or by Zener diodes connected in series. Generally, any means interconnecting the first through the $n^{th}$ stages effecting the sequential conduction of the stages with increasing input signal satisfies the requirement of the biasing network.

The operation of the circuit is best understood by first examining the static condition of the circuit. With no input signal present (i.e., $e_s$ equals zero volts) $Q_{H1}$ through $Q_{Hn}$ will be "on" due to the series cascade connection of the upper row of transistors and the gate of $Q_{Hn}$ being returned to a positive voltage.

Since terminal 102 is connected to ground potential, through the source 106 of input signal, the biasing network 2 provides a continuously increasing reverse bias on the gates of the first to the $n^{th}$ stages, which varies from a value of zero volts at terminal 102 to a value of $V_R$ volts at terminal 104. Substantially equal voltage increments are obtained from the biasing network by means of taps placed substantially equal impedance increments apart along the resistive line. The value of each voltage increment is thus substantially equal to the value of the reverse potential $V_R$ divided by the number of stages $[\Delta_V = V_r/N$ . The proper sequencing of succeeding stages may be affected by the variations in the threshold voltage ($V_T$) from element to element of the lower transistors. Requiring the minimum value of the voltage increment ($V_R/N$) to be greater than the maximum variations in the threshold voltage ($V_T$) obviates the possibility of two stages turning on at any one instant of time and insures proper sequencing along the chain.

The dynamic behavior of the circuit may now be examined by applying a voltage ramp generator signal from source 106, whose output is positive going with respect to ground potential, to the circuit. As the amplitude of the input signal increases, the voltage at the gate of transistor $Q_{L1}$, point 13 on the bias network, will reach a value which exceeds the threshold voltage ($V_T$) of transistor $Q_{L1}$. $Q_{L1}$ starts conducting, creating a low-impedance path between output terminal 11 and the point of reference 3 potential. This effectively causes the output point 11 to go from a value of $+V_{DD}$ to zero volts if the load impedance is high relative to the "on" resistance of transistors $Q_{H1}$ and $Q_{L1}$.

As in the input signal amplitude increases by an additional amount equal to $V_R/N$ volts, transistor $Q_{L2}$ starts conducting, creating a low impedance path between terminal 22 and the point of reference potential 3. This clamps the gate voltage of transistor $Q_{H1}$ to ground, switching transistor $Q_{H1}$ off, which causes output terminal 11 to return to $+V_{DD}$ level through load Z1. Simultaneously a low-impedance path has been created between output terminal 21 and ground. Thus, as the potential on output terminal 11 returns to $+V_{DD}$ the potential on 21 is brought to ground. Thus, transistors $Q_{L1}$ and $Q_{H1}$ have converted the voltage level present at the gate of $Q_{L1}$ into a digital pulse. When the input signal increases by another increment of $V_R/N$ volts, $Q_{L3}$ starts conducting. The drain of $Q_{L3}$, which is DC connected to the gate of $Q_{H2}$, clamps point 32 to ground cutting off $Q_{H2}$. The voltage at the drain of $Q_{H2}$, which is the output point of the second stage, is now returned to $+V_{DD}$ while the voltage at the drain of $Q_{H3}$, point 31, which is the output of stage 3, is effectively grounded. This shows the sequential presentation of pulses on the output lines as the amplitude of the input signal increases. This process will continue until the $n^{th}$ stage is energized and all elements of the solid state sensor, or whatever load is used, have been scanned. The signal level has undergone a two step transformation. The first row of transistors ($Q_{L1}$ through $Q_{Ln}$) converts the signal into sequential voltage steps. The second row of transistors ($Q_{H1}$ through $Q_{Hn}$) converts the sequential steps into sequentially spaced pulses.

The ramp generator may be replaced by a staircase generator having suitable amplitude increments per step. Such a signal source causes the circuit to operate as described above except that the sampling pulses would have faster rising and falling edges resulting in better edge coincidence of adjoining pulses.

An obvious advantage of the present invention is that essentially only one stage is on at any instant of time. As was described above, since the succeeding stage always shuts off the preceding stage, there is only one low impedance conduction path between the source 4 of potential $V_{DD}$ and reference potential. The only additional power dissipation occurs in the switching of the stages "on" and "off." Note that though the transistors in the lower row are turned successively on and remain "on," since the gate-to-source impedance is extremely high ($10^{14}$ ohms or higher) negligible power is consumed.

Another advantage of the present invention is that it permits direct current coupling of the whole system. Thus, there are no capacitors to limit either the low frequency or the upper frequency of operation except for the inherent upper frequency limits of the devices themselves. The slope of the ramp may be varied over a very wide range going from a nearly horizontal rate to an almost vertical sweep without affecting the operation. Varying the slope of the input ramp is equivalent to varying the clock frequency in a standard shift register. The input waveform in the present circuit thus combines two functions: (1) it indicates and determines the propagation of a "1" or "0" and, (2) it determines the frequency of scanning.

The present invention presents a very compact arrangement wherein a minimum number of components per stage and a minimum number of interconnections (only one feedback path from the succeeding stage) are needed. The simplicity of the circuit enables a large number of stages to be produced per unit area, resulting in a high yield at a high density. The high density permissible solves a major problem, as explained above, existing at the interface between two integrated circuit chips. Where the scan generator consists of scanning stages whose density matches the elements of the solid-state sensor, the two chips may be abutted, permitting the bonding of leads from one chip to the next. These leads may be very short, allowing the two segments of the system to be tightly connected.

FIG. 3 depicts a hybrid circuit embodying one stage of the invention wherein an IGFET may be combined with a bipolar device to achieve the results described above. In addition, FIG. 4 depicts an embodiment of the invention wherein the two active devices per stage comprise two bipolar devices connected in series.

The embodiments shown employ either NPN bipolar devices or N-channel IGFETs. But, it should be obvious to one skilled in the art that PNP bipolar and P-channel IGFETs may be used to practice the invention. In addition, the invention is not limited to scan generators alone but may be used as a rudimentary analog-to-digital converter wherein the number of pulses produced and the pulse position are functions of the amplitude of the input signal waveform.

Figure 5:
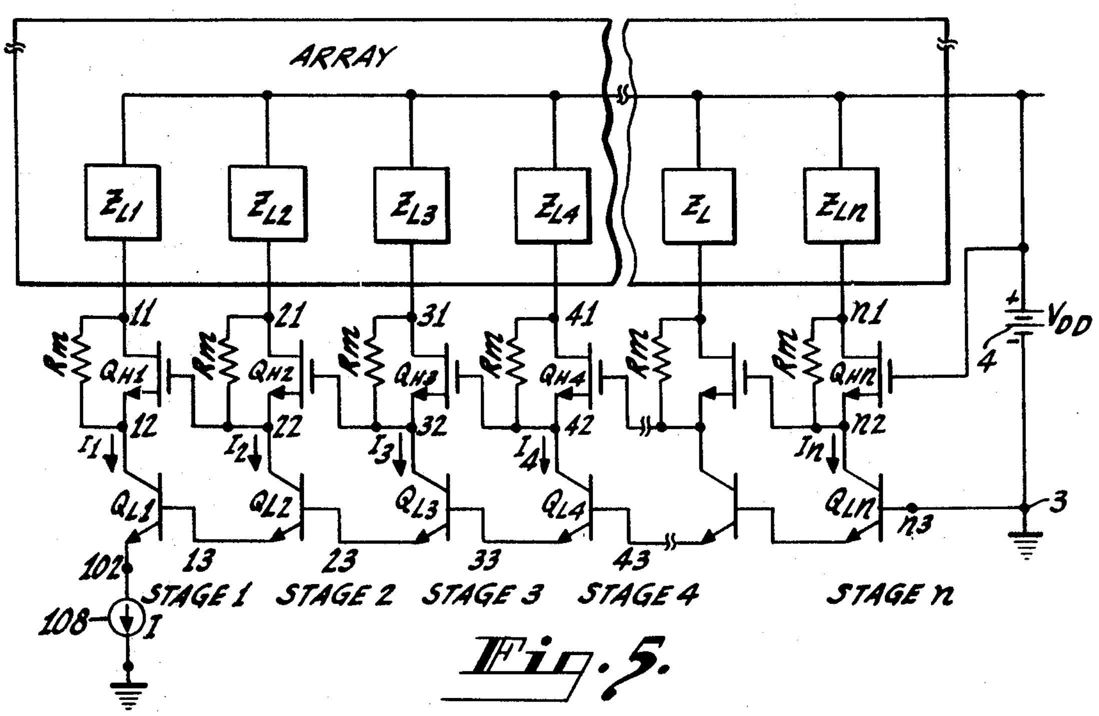
FIG. 5 is a schematic drawing of a current steered scan generator circuit embodying the invention.

Another embodiment of the invention is depicted in FIG. 5 wherein an input current ramp is converted by N identical stages connected in cascade into sequentially spaced pulses on N parallel output lines. Each stage comprises two active devices, a lower bipolar NPN-type transistor ($Q_{L1}$...$Q_{Ln}$) and an upper N-channel enhancement type transistor, ($Q_{H1}$...$Q_{Hn}$) the latter being shunted by an impedance $R_M$.

Since the N stages are structurally identical, only the first stage will be described in detail. The output terminal 11 at the drain electrode of upper transistor $Q_{H1}$ is connected to one end of load impedance $Z_{L1}$, the other end of $Z_{L1}$ being connected to a source 4 of $+V_{DD}$ potential. The source electrode of transistor $Q_{H1}$ is connected to junction point 12, which is direct current connected to the collector of lower transistor $Q_{L1}$. The gate of transistor $Q_{H1}$ is direct current connected to the succeeding stage at junction point 22, which is the common connection point of the source electrode of transistor $Q_{H2}$ and the collector of transistor $Q_{L2}$. The base of transistor $Q_{L1}$ is connected to the emitter of transistor $Q_{L2}$ and the emitter of transistor $Q_{L1}$ is connected to terminal 102 to which the input signal from current generating means 108 is applied.

The connections to the last stage differ from the rest in that the gate electrode of transistor $Q_{Hn}$ is returned to a source 4 of potential $V_{DD}$ which statically turns "on" the upper row of transistors ($Q_{H1}$...$Q_{Hn}$). The base of transistor $Q_{Ln}$ is returned to a point of reference potential 3.

The series cascade connection of the lower row of transistors provides cumulative voltage increments between each stage due to the forward voltage drop of the base-to-emitter junction ($V_{BE}$), and high impedance between stages due to the current gain of each stage. This type of connection provides the sequencing control means whereby the transistors of the lower row are progressively energized in a sequence ranging from the lowest to the highest stage as the signal level increases in amplitude.

Dynamically, the behavior of the circuit is most easily described by assuming that the bipolar transistors, $Q_{L1}$ through $Q_{Ln}$, have a very high forward current gain and that the effect of $V_{BE}$ may be neglected if the number of stages is kept small. Note also, that IGFETs $Q_{H1}$ through $Q_{Hn}$ have a low "on" impedance ($R_D$) and an "off" impedance which is much larger than the resistance $R_M$ shunting the drain-to-source electrodes.

A current ramp from generator 108 is applied between terminal 102 and the point 3 of reference potential with a polarity to cause an increasing current to flow out of terminal 102. As the signal input increases, the current $I_1$ increases in direct relation thereto until $Q_{L1}$ saturates at a first value of saturation current ($I_S$) limited by the value of load resistance ($R_L$) and the "on" resistance ($R_D$), where $$\left[I_S \cong \frac{V_{DD}}{R_L+R_D}\right].$$

After $Q_{L1}$ saturates, any increase in the amplitude of the signal current is steered to transistor $Q_{L2}$ by means of the diodelike behavior of the base-emitter junction of transistor $Q_{L1}$. Increasing the emitting current causes the collector current $I_2$ ($\alpha I_e$ to increase in direct relation thereto. The collector voltage of $Q_{L2}$, at point 22, which is DC coupled to the gate of transistor $Q_{H1}$, continues to fall until the gate-to-source voltage ($V_{GS}$) of transistor $Q_{H1}$ is below its threshold voltage ($V_T$). This turns $Q_{H1}$ "off," causing the current $I_1$ to instantaneously decrease to a second value of saturation current limited by the value of the series resistance of $R_L$ and $R_M$, where $$\left[I_M \cong \frac{V_{DD}}{R_L+R_M}\right].$$

Since $R_M$ is much greater than $R_D$, $I_S$ is greater than $I_M$. The current differential between the first and second value of saturation current ($I_S-I_M$) is then steered progressively up the chain. The current step is sufficiently large to saturate transistor $Q_{L2}$ and to substantially increase the current flowing through $Q_{L3}$. Any increase in signal current level is now steered to the emitter of $Q_{L3}$ by means of the diode like behavior of the base-to-emitter junctions of transistors $Q_{L1}$ and $Q_{L2}$. As the signal continues to increase, the sequence of events experienced in stages one and two is repeated, until the last stage is energized.

The use of $R_M$ in the embodiment shown is dictated by the extremely high value of "off" resistance of the enhancement type device. If a finite value of resistance were not present, the current differential would be equal to the first value of saturation current resulting in an uncontrolled sequencing of the N stages as soon as stage number one was cut "off." If the IGFET used is a depletion type unit, a separate resistor would not be needed as $R_M$ would simply be the zero gate bias channel resistance.

Note that in the embodiments shown in FIG. 1 and in FIG. 5, the basic switching mechanism is the same. The two active devices connected in series perform an AND function, that is, they provide a low impedance conduction path when their control electrodes are simultaneously energized. The control electrode of each transistor in the upper row of active devices is returned to a common point of the succeeding stage. The common point will either be clamped to a positive voltage by means of the follower output action of the active device of the upper row or, if the active device of the lower row is energized, the common point will be clamped to ground.

The two-step transformation of a signal level into a pulse is a direct consequence of the above. As the lower row transistors are energized, the signal level is converted into sequential voltage steps (switch closures) at the output points of the lower row. This step is fed back to clamp the gate electrode of the upper row transistor of the preceding stage. A typical stage will thus have both control electrodes energized with a polarity to induce conduction for a period of time starting when its lower row transistor is energized and ending when the lower row transistor of the next stage is energized.

What is claimed is:

1. A sequential switching circuit comprising:

N output terminals, where N is an integer greater than 1;

N stages, each stage comprising a first normally on active device and a second normally off active device serially connected between a different output terminal and a common point of reference potential, each device having first and second electrodes defining the ends of a conduction path and a control electrode, the first electrode of each first device being connected to the second electrode of the second device of the same stage at a junction point, the first electrode of each second device being connected to the common point of reference potential, and the second electrode of each first device being connected to a different output terminal;

sequencing control means connected to the control electrode of the normally off second device for turning on the second device of the first through $n^{th}$ stage progressively in that order; and feedback means connecting the second active device of each stage after the first to the control electrode of the first active device of each preceding stage, responsive to the turning on of any second active device for turning off the first active device of the preceding stage.

2. The combination as claimed in claim 1, wherein said feedback means comprises means direct current connecting the junction point of a stage to the control electrode of the first device of the preceding stage.

3. The combination as claimed in claim 2, wherein the sequencing control means comprises a network having "N" taps and one input point, said combination further including:

means for applying an input signal to said input point;

means direct current connecting each control electrode of said second active devices to a different one of said taps in a sequence that renders the lowest numbered stage conducting first and the $n^{th}$ stage conducting last as the input signal increases in a direction to cause said second active devices to conduct; and means for connecting the first electrode of said first active devices, and the output load means to points of suitable operating potential.

4. The combination as claimed in claim 3, wherein said first and second active devices are insulated-gate field-effect transistors each having a source electrode, a drain electrode and a gate electrode; wherein the gate is said control electrode, the source is said first electrode and the drain is said second electrode.

5. The combination as claimed in claim 3, wherein said first and second active devices are bipolar transistors each having a base, an emitter and a collector, wherein the base is said control electrode, the emitter is said first electrode and the collector is said second electrode thereof.

6. The combination as claimed in claim 2, wherein said second active device is a bipolar transistor having a base, an emitter and a collector, wherein the base is said control electrode, the emitter is said first electrode and the collector is said first electrode thereof, and wherein said second active device is an insulated-gate field-effect transistor having a gate electrode, a source electrode and a drain electrode, wherein said gate electrode is said control electrode, said source electrode is said first electrode and said drain electrode is said second electrode thereof.

7. The combination comprising:

N output terminals;

a chain of N stages where N is an integer greater than 1, each stage comprising: (a) an insulated-gate field-effect transistor (IGFET) having a source and a drain electrode defining the ends of a conduction path and a gate electrode, and (b) a bipolar transistor having a base, a collector and an emitter, said IGFET having one of its drain and source electrodes connected to a different one of said N output terminals and the other of its drain and source electrodes connected to the collector of its associated bipolar transistor to form a junction point;

means direct current connecting the gate electrode of each stage, other than the last stage, to the junction point of the succeeding stage;

means connecting the base of each bipolar transistor to the emitter of the bipolar transistor of the next succeeding stage; and means for supplying a source of signal current to the emitter of the bipolar transistor of the first stage for conducting a current through the base-to-emitter regions of said bipolar transistors for successively energizing, one stage at a time, the first through Nth stage.

8. In combination:

N stages, each stage comprising the conduction path of a first field-effect transistor connected at one end to a common circuit point and the conduction path of a second field-effect transistor connected at one end to an output terminal and at the other end to the other end of the conduction path of the first transistor, each transistor having a control electrode for controlling the conductivity of its conduction path;

means coupled to the control electrodes of the second transistors for maintaining the conduction paths thereof normally in a relatively low impedance condition;

means coupled to the control electrodes of the first transistors for maintaining the conduction paths thereof normally in a relatively low impedance condition;

means coupled to the control electrodes of the first transistors for maintaining the conduction paths thereof normally in a high impedance condition;

means coupled to the control electrodes of said first transistors for applying thereto, in sequence, a signal for changing the impedance of their conduction paths from a relatively high impedance to a relatively low impedance condition; and means responsive to a low impedance condition of the conduction path of the first transistor of any stage after the first of said N stages for applying a signal to the control electrode of the second transistor of the preceding stage in a sense to change the impedance of the latter's conduction path from its relatively low to its relatively high impedance condition.